US009052393B2

United States Patent
Kriel et al.

(10) Patent No.: US 9,052,393 B2
(45) Date of Patent: Jun. 9, 2015

(54) OBJECT RECOGNITION SYSTEM HAVING RADAR AND CAMERA INPUT

(71) Applicant: Caterpillar Inc., Peoria, IL (US)

(72) Inventors: Bradley Scott Kriel, Pittsburgh, PA (US); Daniel Morris, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 187 days.

(21) Appl. No.: 13/745,633

(22) Filed: Jan. 18, 2013

(65) Prior Publication Data

US 2014/0203959 A1    Jul. 24, 2014

(51) Int. Cl.

| | |
|---|---|
| *G01S 13/86* | (2006.01) |
| *G01S 13/93* | (2006.01) |
| *G01S 7/41* | (2006.01) |
| *G06K 9/62* | (2006.01) |
| *G01S 13/00* | (2006.01) |
| *G01S 7/00* | (2006.01) |
| *G01S 13/72* | (2006.01) |

(52) U.S. Cl.
CPC ............... *G01S 13/867* (2013.01); *G01S 13/93* (2013.01); *G01S 13/726* (2013.01); *G01S 13/931* (2013.01); *G06K 9/62* (2013.01)

(58) Field of Classification Search
CPC ....... G01S 13/86; G01S 13/867; G01S 13/38; G01S 13/93; G01S 13/66; G01S 13/72; G01S 13/723; G01S 13/726; G01S 13/931; G06K 9/00; G06K 9/62
USPC ......... 342/52–55, 61, 66, 70–72, 89, 90, 175, 342/176, 179, 190–197, 27, 28; 701/300, 701/301; 348/61, 143, 148, 149
See application file for complete search history.

(56) References Cited

U.S. PATENT DOCUMENTS

| | | | |
|---|---|---|---|
| 6,269,308 B1 * | 7/2001 | Kodaka et al. ................. | 701/301 |
| 6,873,899 B2 * | 3/2005 | Sawamoto ..................... | 701/300 |
| 6,941,211 B1 * | 9/2005 | Kuroda et al. .................. | 701/70 |
| 7,042,389 B2 * | 5/2006 | Shirai ............................. | 342/70 |

(Continued)

FOREIGN PATENT DOCUMENTS

| | | |
|---|---|---|
| CN | 102508398 | 6/2012 |
| EP | 1 634 243 B1 | 3/2006 |

(Continued)

OTHER PUBLICATIONS

U.S. Patent Application of Brad Scott Kriel et al., entitled "Object Recognition System Implementing Image Data Transformation" filed on Jan. 18, 2013, U.S. Appl. No. 13/745,637.

(Continued)

*Primary Examiner* — Bernarr Gregory
(74) *Attorney, Agent, or Firm* — Finnegan, Henderson, Farabow, Garrett & Dunner, LLP

(57) ABSTRACT

A object recognition system has a camera configured to generate image data of an environment of a machine and a radar device configured to generate radar data of the environment of the machine. The object recognition system also has a processor configured to detect an object in the environment based on the radar data, map the radar data to a portion of the image data corresponding to the detected object, and classify the detected object using the mapped portion of the image data.

20 Claims, 6 Drawing Sheets

(56) References Cited

U.S. PATENT DOCUMENTS

| | | |
|---|---|---|
| 7,042,508 B2 | 5/2006 | Jan et al. |
| 7,176,830 B2 * | 2/2007 | Horibe ............................ 342/70 |
| 7,233,233 B2 * | 6/2007 | Taniguchi et al. ............ 348/148 |
| 7,376,247 B2 | 5/2008 | Ohta et al. |
| 7,432,848 B2 * | 10/2008 | Munakata ....................... 342/52 |
| 7,570,198 B2 | 8/2009 | Tokoro |
| 7,756,298 B2 | 7/2010 | Miyahara et al. |
| 7,777,669 B2 | 8/2010 | Tokoro et al. |
| 8,068,134 B2 | 11/2011 | Yoshizawa |
| 2002/0191078 A1 | 12/2002 | Okamoto et al. |
| 2004/0178945 A1 | 9/2004 | Buchanan |
| 2007/0075892 A1 * | 4/2007 | Horibe ............................ 342/70 |
| 2011/0050482 A1 | 3/2011 | Nanami |
| 2011/0074916 A1 | 3/2011 | Demirdjian |
| 2011/0184617 A1 | 7/2011 | Hegemann et al. |
| 2012/0262580 A1 | 10/2012 | Huebner et al. |

FOREIGN PATENT DOCUMENTS

| | | |
|---|---|---|
| EP | 1 847 849 A2 | 10/2007 |
| JP | 2010171914 | 8/2010 |
| JP | 2011210232 | 10/2011 |

OTHER PUBLICATIONS

U.S. Patent Application of Brad Scott Kriel et al., entitled "Image Processing System Using Unified Images" filed on Jan. 18, 2013, U.S. Appl. No. 13/745,641.

* cited by examiner

OBJECT RECOGNITION SYSTEM HAVING RADAR AND CAMERA INPUT

TECHNICAL FIELD

The present disclosure relates generally to an object recognition system and more particularly, to an object recognition system having radar and camera input.

BACKGROUND

Various machines, such as those that are used to dig, loosen, carry, compact, etc., different materials, may be equipped with object detection and recognition systems that incorporate devices such as radio detection and ranging (radar) devices and/or cameras. In some applications, machines use object detection and recognition devices for safety. For example, in one application, autonomous or semi-autonomous machines may use object detection devices to detect objects in areas surrounding the machines as part of a collision avoidance mechanism. In another application, object detection devices can assist an operator of large machines by detecting objects that are out of the operator's field of view, classifying the objects, and initiating a safety protocol based on the classification of the object.

Some object detection and recognition systems are radar based and only use radar data because radar data can be processed quickly. One downside to radar based object detection and recognition systems, however, is that they offer unsatisfying performance as radar data lacks the specificity needed to accurately distinguish between two objects of different class (for example, a person or a light vehicle). On the other hand, object detection and recognition systems relying on image data from cameras must constantly process large amounts of data in real-time, or near real-time, using complex algorithms. For example, when a large machine is equipped with multiple cameras covering all sides of the large machine, the object detection and recognition system may constantly receive streams of data from all of the and cameras and process it using computationally expensive image processing techniques. Accordingly, an object detection and recognition system that offers the speed of radar based systems and offers the accuracy of image based systems may be desirable, especially in applications involving large machines.

One system attempting to decrease the computation time needed to process object detection in images is disclosed in U.S. Pat. No. 8,068,134 to Yoshizawa, which issued on Nov. 29, 2011 (the '134 patent). The system in the '134 patent incorporates a radar sensor scanning the front of a passenger vehicle and a camera taking images in front of the passenger vehicle. The radar sensor detects objects within a range and direction in front of the vehicle, and a portion of an image corresponding to the range and direction is processed to detect an object.

Although the system of the '134 patent may be suitable for passenger vehicles, it may not be suitable for applications involving large machines. For example, object detection and recognition systems of large machines generally require object detection on all sides of the vehicle as an operator's field of view may be limited on all sides of the vehicle. Further, many object detection and recognition systems of large machines classify objects according their type (for example, equipment, large vehicle, or person) which requires additional processing and computing resources. As a result, large vehicle object detection and recognition systems must process more data faster than what could be accomplished using the system disclosed in the '134 patent. Accordingly, additional performance and accuracy advantages beyond the system of the '134 patent may be desirable.

The disclosed object recognition system is directed to overcoming one or more of the problems set forth above and/or other problems of the prior art.

SUMMARY

In one aspect the present disclosure is directed to an object recognition system including a camera configured to generate image data of an environment of a machine and a radar device configured to generate radar data of the environment of the machine. The object recognition system may also include a processor configured to detect an object in the environment based on the radar data, map the radar data to a portion of the image data corresponding to the detected object, and classify the detected object using the mapped portion of the image data.

The present disclosure is also directed to a method for recognizing objects in an environment of a machine using a radar device and an image device including accessing radar data of the radar device, detecting an object in the environment of the machine based on the radar data, accessing image data of the image device, mapping the radar data to a portion of the image data corresponding to the detected object, and classifying the detected object using the mapped portion of the image data.

DETAILED DESCRIPTION

Figure 1:
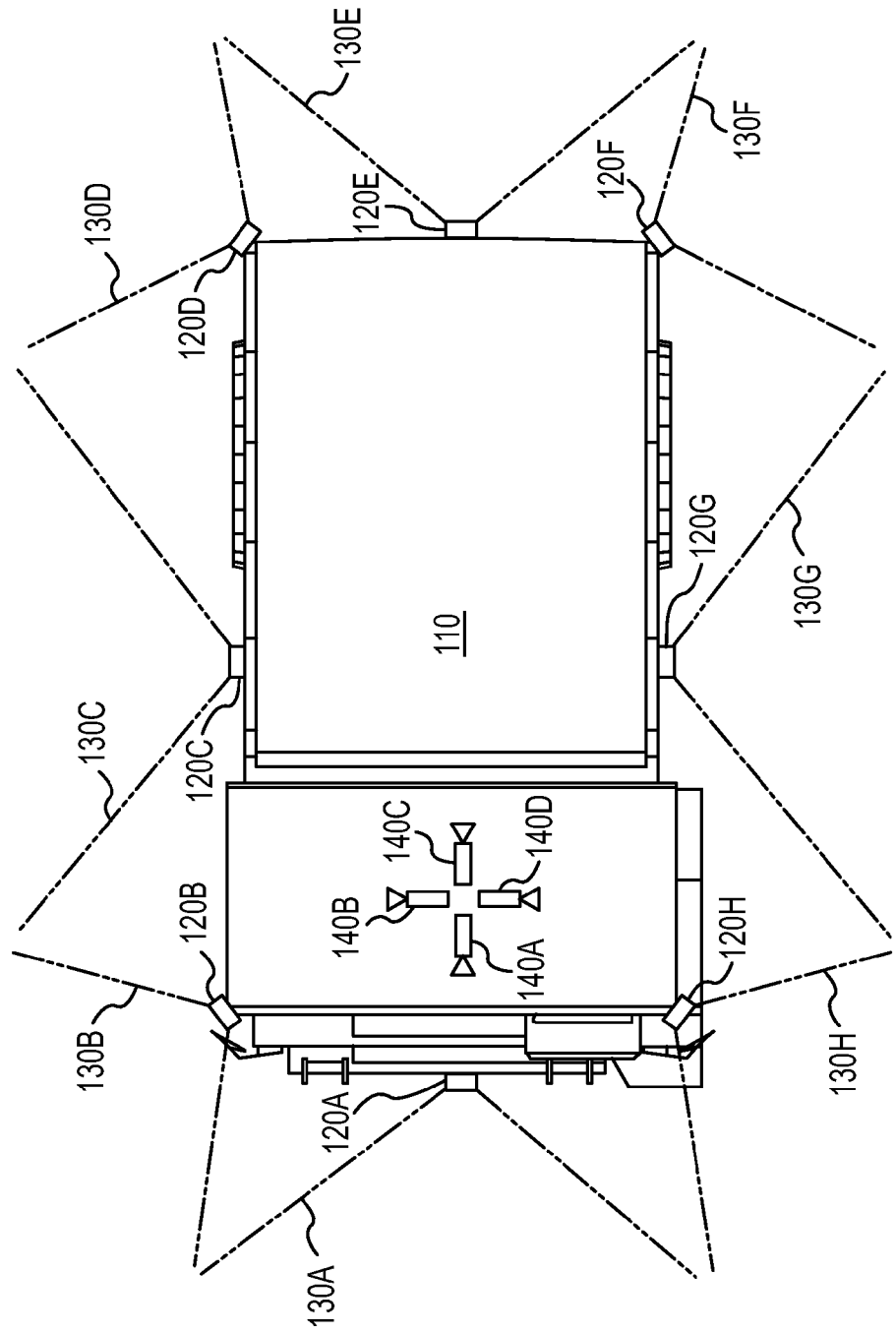
FIG. 1 is a pictorial illustration of an exemplary disclosed machine.

FIG. 1 illustrates an exemplary machine 110 having multiple systems and components that cooperate to accomplish a task. Machine 110 may embody a fixed or mobile machine that performs some type of operation associated with an industry such as mining, construction, farming, transportation, or any other industry known in the art. For example, machine 110 may be an earth moving machine such as an excavator, a dozer, a loader, a backhoe, a motor grader, a dump truck, or any other earth moving machine. Machine 110 may include one or more of radar devices 120*a*-120*h* and cameras 140*a*-140*d*. Radar devices 120*a*-120*h* and cameras 140*a*-140*d* may be included on machine 110 during operation of machine 110, e.g., as machine 110 moves about an area to complete certain tasks such as digging, loosening, carrying, drilling, or compacting different materials.

Machine 110 may use radar devices 120*a*-120*h* to detect objects in their respective fields of view 130*a*-130*h*. For example, radar device 120a may be configured to scan an area within field of view 130a to detect the presence of one or more objects. During operation, one or more systems of machine 110 (not shown) may process radar data received from radar device 120a to detect objects that are in the environment of machine 110. For example, a collision avoidance system may use radar data to control machine 110 to prevent it from colliding with objects in its path. Moreover, one or more systems of machine 110 may generate an alert, such as a sound, when an object is detected in the environment of machine 110. Cameras 140a-140d may be attached to the frame of machine 110 at a high vantage point. For example, cameras 140a-140d may be attached to the top of the frame of the roof of machine 110. Machine 110 may use cameras 140a-140d to detect objects in their respective fields of view. For example, cameras 140a-140d may be configured to record image data such as video or still images.

During operation, one or more systems of machine 110 (not shown) may render the image data on a display of machine 110 and/or may process the image data received from the cameras to detect objects that are in the environment of machine 110. For example, when the one or more systems of machine 110 detect an object in the image data, the image data may be rendered on the display. According to some embodiments, the one or more systems or machine 110 may render an indication of the location of the detected object within the image data. For example, the one or more systems of machine 110 may render a colored box around the detected object, or render text below, above, or to the side of the detected object.

While machine 110 is shown having eight radar devices 120a-120h, and four cameras 140a-140d, those skilled in the art will appreciate that machine 110 may include any number of radar devices and cameras arranged in any manner. For example, machine 110 may include four radar devices on each side of machine 110.

Figure 2:
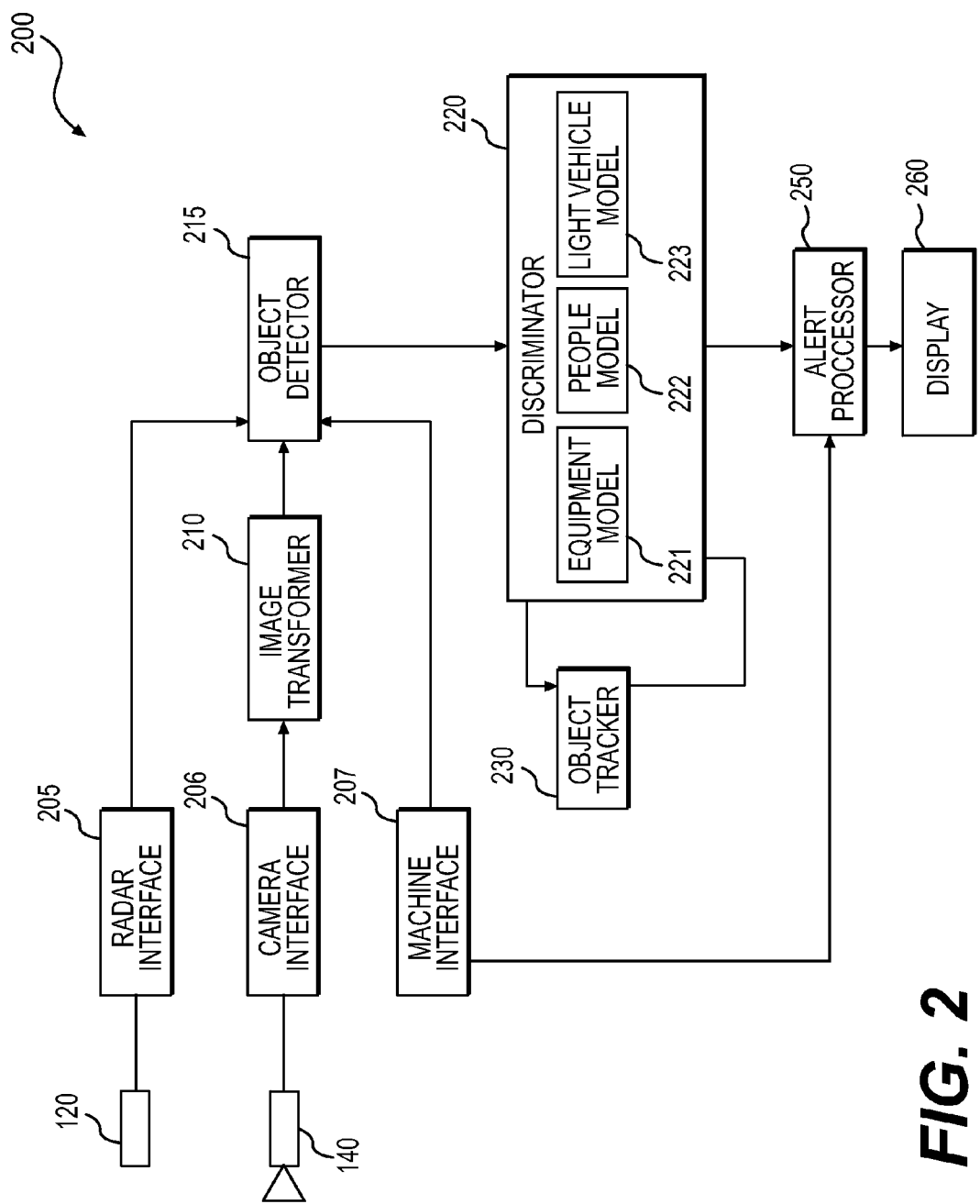
FIG. 2 is a block diagram illustrating an exemplary object recognition system for the machine of FIG. 1.

FIG. 2 is a block diagram illustrating an exemplary object recognition system 200 that may by installed on machine 110 to detect and recognize objects in the environment of machine 110. Object recognition system 200 may include one or more modules that when combined perform object detection and recognition. For example, as illustrated in FIG. 2, object recognition system 200 may include radar interface 205, camera interface 206, machine interface 207, image transformer 210, object detector 215, discriminator 220, object tracker 230 and alert processor 250. While FIG. 2 shows components of object recognition system 200 as separate blocks, those skilled in the art will appreciate that the functionality described below with respect to one component may be performed by another component, or that the functionality of one component may be performed by two or more components. For example, the functionality of object tracker 230 may be performed by object detector 215 or discriminator 220, or the functionality of image transformer 210 may be performed by two components.

According to some embodiments, the modules of object recognition system 200 described above may include logic embodied as hardware, firmware, or a collection of software written in a known programming language. The modules of object recognition system 200 may be stored in any type of computer-readable medium, such as a memory device (e.g., random access, flash memory, and the like), an optical medium (e.g., a CD, DVD, BluRay®, and the like), firmware (e.g., an EPROM), or any other storage medium. The modules may be configured for execution by one or more processors to cause the object recognition system 200 to perform particular operations. The modules of the object recognition system 200 may also be embodied as hardware modules and may be comprised of connected logic units, such as gates and flip-flops, and/or may be comprised of programmable units, such as programmable gate arrays or processors, for example.

Object recognition system 200 may include radar device 120 and camera 140. Radar device 120 may correspond to one or more of radar devices 120a-120h and camera 140 may correspond to one or more of cameras 140a-140d, for example. Moreover, while only one radar device 120 and one camera 140 are shown in FIG. 2, those skilled in the art will appreciate that any number of radar devices and cameras may be included in object recognition system 200.

In some aspects, before the object recognition system 200 can process radar data from radar device 120 and image data from the camera 140, the radar data and the image data must be converted to a format that is consumable by the modules of object recognition system 200. Accordingly, radar device 120 may be connected to radar interface 205, and camera 140 may be connected to camera interface 206. Radar interface 205 and camera interface 206 may receive analog signals from their respective devices and convert them to digital signals which may be processed by the other modules of the object recognition system 200. For example, radar interface 205 may create digital radar data using information it receives from radar device 120, and camera interface 206 may create digital image data using information it receives from camera 140. According to some embodiments, radar interface 205 and camera interface 206 may package the digital data in a data package or data structure along with metadata related to the converted digital data. For example, radar interface 205 may create a data structure or data package that has metadata and a payload representing the radar data from radar device 120. Non-exhaustive examples of metadata related to the radar data may include the orientation of radar device 120, the position of radar device 120, and/or a time stamp for when the radar data was recorded. Similarly, camera interface 206 may create a data structure or data package that has metadata and a payload representing image data from camera 140. Non-exhaustive examples of metadata related to the image data may include the orientation of camera 140, the position of camera 140 with respect to machine 110, the down-vector of camera 140, a time stamp for when the image data was recorded, and a payload field representing the camera data from the camera 140. In some embodiments, radar device 120 and camera 140 may be digital devices that produce data, and the radar interface 205 and the camera interface 206 may package the digital data into a data structure for consumption by the other modules of object recognition system 200. Radar interface 205 and camera interface 206 may expose an application program interface (API) that exposes one or more function calls allowing the other modules of object recognition system 200, such as object detector 215, to access the radar data and the image data.

In addition to radar interface 205 and camera interface 206, object recognition system 200 may also include machine interface 207. Machine interface 207 may connect with one or more sensors deployed on machine 110 and may translate signals from the one or more sensors to digital data that may be consumed by the modules of object recognition system 200. The digital data may include operational state data that includes information related to machine's 110 current operation. For example, the operational state data may include the current speed of machine 110, the current direction of machine 110 (e.g., forward or backward), the current steering angle of machine 110, or the acceleration of machine 110. The operational state data may also include information about tools or other work components of machine 110. For example, the operational state data may include the position of loading or digging arms, or the angle/position of load bed attached to machine 110. The operational state data may also include metadata such as a time stamp or an identifier of the tool or work component to which the operational state data applies. Machine interface 207 may expose an API providing access to the operational state data of the machine 110 to the modules of object recognition system 200, such as alert processor 250 and object detector 215.

Object recognition system 200 may also include object detector 215. Object detector 215 accesses data from the radar interface 205 and the camera interface 206 and processes it to detect objects that are in the environment of machine 110. The radar data accessed from radar interface 205 may include an indication that an object was detected in the environment of the machine 110. Object detector 215 may access radar data by periodically polling radar interface 205 for radar data and analyzing the data to determine if the data indicates the presence of an object. Object detector 215 may also access radar data through an event or interrupt triggered by radar interface 205. For example, when radar device 120 detects an object, it may generate a signal that is received by radar interface 205, and radar interface 205 may publish an event to its API indicating that radar device 120 has detected an object. Object detector 215, having registered for the event through the API of radar interface 205, may receive the radar data and analyze the payload of the radar data to determine whether an object has been detected. Once an object has been detected via radar, object detector 215 may access image data through the camera interface 206 and process the image data.

As processing image data is computationally expensive, object detector 215 may advantageously limit the amount of image data that is processed by using radar data corresponding to the image data. The radar data may be used, for example, to limit processing to the parts of the image data where an object is expected. For example, object detector 215 may map accessed radar data to accessed image data and only process the portions of the image data that correspond to an object detected in the accessed radar data. Object detector 215 may map radar data to image data using metadata related to the orientation and position of radar device 120 and camera 140. For example, when object detector 215 receives radar data from radar device 120 positioned on the rear of machine 110, it may map that radar data to image data from camera 140 that is also positioned on the rear of machine 110.

In addition to the orientation and position of radar device 120, the radar data may indicate a location within radar device's 120 field of view 130 where the object was detected. For example, the radar data may indicate the distance and angular position of the detected object. In some embodiments, object detector 215 may map the distance and angular position of the object in the radar data to a pixel location in the image data. The mapping may be accomplished through a look-up table where distances and angular positions for radar device 120 are linked to pixels of the images captured by camera 140. For example, a point at 5 meters, 25 degrees in radar device's 120 field of view may correspond to a pixel at (300, 450) in an image captured by camera 140. In some embodiments, radar interface 205 may map radar data to image data and the payload of the radar data may be expressed in pixels, as opposed to distance and angular position. The look-up table may be stored in a computer readable data store or configuration file that is accessible by object detector 215 or radar interface 205, and the look-up table may be configurable based on the position of each radar device and camera on machine 110 and the application of machine 110. Although a look-up table is one method by which object detector 215 or radar interface 205 may map radar data to image data, those skilled in the relevant art will appreciate that other methods for mapping radar data to image data may be used to achieve the same effect.

Object detector 215 may also process image data to detect objects within the image data. As indicated above, object detector 215 may only process a portion of the image data that has been mapped to radar data indicating the presence of an object. Object detector 215 may detect objects in the image by using edge detection techniques. For example, the object detection 215 may analyze the mapped image data for places where image brightness changes sharply or has discontinuities. Object detector 215 may employ a known edge detection technique such as a Canny edge detector. Although edge detection is one method by which object detector 215 may detect objects in images, those skilled in the relevant art will appreciate that other methods for detecting objects in image data may be used to achieve the same effect.

When object detector 215 detects an object in the radar data and the image data, it may provide detected object data to discriminator 220 to classify the detected object according to an object classification model. The detected object data provided by the object detector 215 may include metadata related to the detected object and a payload. Non-exhaustive examples of metadata for the detected object data may include the position of the object within the image data, the distance of the detected object from the radar device 120, and/or the angular position of the detected object. The payload may include the output of edge detection, that is, image data that describes the shape of the object, for example. Once discriminator 220 receives the detected image data it may determine the object's type.

Discriminator 220 may use several object classification models to determine the type of object detected by object detector 215. For example, as illustrated in FIG. 2, discriminator 220 may use an equipment model 221, a people model 222, or a light vehicle model 223 to classify a detected object as a piece of equipment, a person or a light vehicle, respectfully. The discriminator 220 may compare the metadata and the payload of the detected object data to the classification models and determine whether the detected object data is consistent with parameters of the classification model. For example, the people model 222 may include parameters related to the ratio of the size of a person's head to the size of a person's body, and may also include parameters indicating that, in general, a person is in the shape of an upright rectangle. When the discriminator 220 receives detected object data of a person, it may compare the shape of the image data of the payload (most likely an upright rectangle) with the expected shape described by people model 222. If the shape of the payload is similar to the shape described by people model 222, discriminator 220 may classify the detected object as a person.

Figure 3:
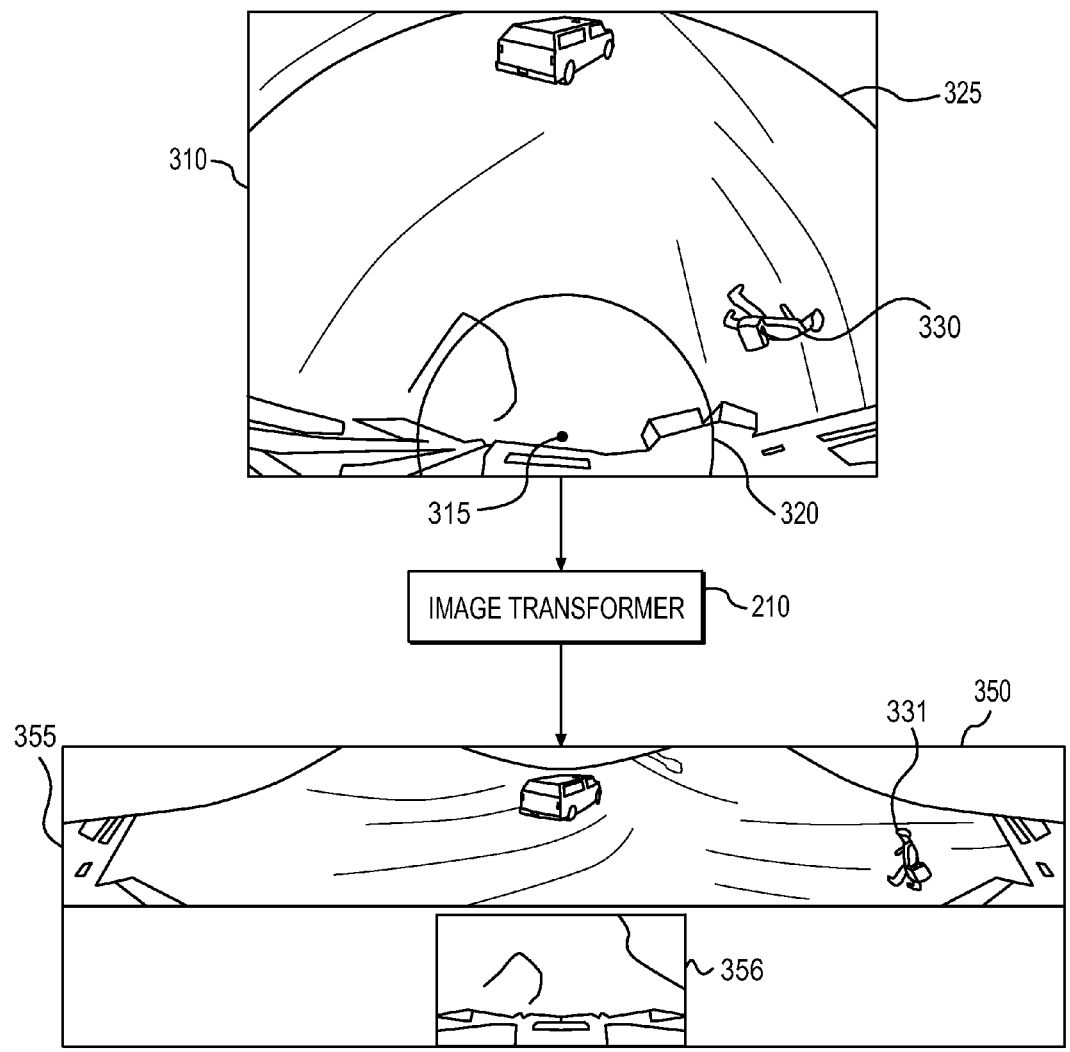
FIG. 3 is pictorial illustration of an exemplary disclosed source image and an exemplary disclosed transformed image that may have been transformed by the object recognition system of FIG. 2.

As discriminator 220 may rely on the shape of detected objects, the format and orientation of the images recorded by camera 140 may affect discriminator's 220 accuracy. For example, camera 140 may be a wide-angle top-down view camera, birds-eye view camera, fisheye camera, or some other camera that produces an image that is from a perspective other than a ground level perspective. As a result, the images produced by camera 140 may include objects oriented on their sides as opposed to upright. For example, as illustrated in FIG. 3, person 330 appears to be oriented sideways as opposed to upright. As a result, one problem discriminator 220 may encounter is classifying objects according to several orientations. One solution might be to include multiple orientations in the parameters of each object classification model to accommodate for the possible multiple orientations objects may have in the image data. For example, people model 222 may include parameters describing the shape of a person upright, sideways, or orientations between upright and sideways. While this approach may be effective, it is computationally expensive and must consider almost infinite orientations. Accordingly, in some embodiments, object recognition system 200 may include an image transformer 210 that transforms image data received by camera interface 206 so that discriminator 220 does not need to account for object orientation when classifying an object.

FIG. 3 is pictorial illustration of a source image 310 that may have been captured by camera 140 and a transformed image 350 that may have been transformed by object recognition system 200. As shown in FIG. 3, source image 310 may be transformed by image transformer 210. Image transformer 210 may transform images using a mapping of pixels from source image 310 to transformed image 350. The mapping may be configured to advantageously orient objects upright. For example, as shown in FIG. 3, person 330 is oriented sideways in source image 310, and the pixel mapping used by image transformer 210 orients person 331 upright in transformed image 350. Conceptually, image transformer 210 may use a mapping which maps the pixels of source image 310 to the lateral surface of a conical cylinder. Once the pixels are mapped to the surface of the conical cylinder, the lateral surface is then mapped to a rectangle for image processing. In application, image transformer 210 may map pixels directly from the source image 310 to pixel positions of transformed image 350.

In some embodiments, image transformer 210 may use different mappings for different portions of the source image 310. For example, image transformer 210 may use a first mapping for a first portion of source image 310 to produce a first transformed image portion 355, and a second mapping for a second portion of source image 310 to produce a second transformed image portion 356. Image transformer 210 may use different mappings to accommodate for the geometry of the lens of camera 140. For example, camera 140 might capture source image 310 such that the horizontal perspective is captured as a radial perspective where the down-vector 315 of the camera is the radius of the perspective of the camera image. According to some embodiments, image transformer 210 is configured to transform the portion of source image 310 between a minimum radius 320 and a maximum radius 325. Minimum radius 320 may represent the lower boundary for image transformation, and may be defined as a first number of pixels from the down-vector 315. For example, minimum radius 320 may be the radius formed by those pixels that are 150 pixels away from the pixel corresponding to down-vector 315. Maximum radius 325 may represent the upper boundary for image transformation, and may be defined as a second number of pixels from the pixel corresponding to down-vector 315. For example, maximum radius 325 may be the radius formed by those pixels that are 450 pixels away from the pixel corresponding to the down-vector 315. As shown in FIG. 3, image transformer 210 may transform the portions of source image 310 between minimum radius 320 and maximum radius 325 using a first mapping to create first transformed image portion 355. Those pixels closer to the down-vector 315 than the minimum radius 320 may be transformed using a second mapping to create second transformed image portion 356.

In some embodiments, minimum radius 320 may correspond to the distance of the closest object detected by radar device 120 and maximum radius 325 may correspond to the distance of the farthest object detected by radar device 120. Accordingly, image transformer 210 may only map a portion of source image 310 where objects have been detected in the radar data. For example, radar device 120 may detect a first object ten meters from machine 110 and may detect a second object twenty-five meters from machine 110. Image transformer 210 may set minimum radius 320 to a pixel value corresponding to a distance ten meters from down-vector 315 and may set maximum radius 325 to a pixel value corresponding to a distance twenty-five meters from machine 110. In some embodiments, the corresponding pixel values for distances from machine 110 may be stored in a data structure whose values are set during the calibration of radar device 120 and camera 140.

Image transformer 210 may perform additional processing on source image 310 so the discriminator 220 may process image data more efficiently. For example, image transformer 210 may apply a gradient mask to source image 310 before creating transformed image 350 to remove any artifacts that are around the black regions of source image 310. Image transformer 210 may also apply the gradient mask to transformed image 350. The mask may filter out gradients at the boundaries of black regions, thereby providing a smoothed image for object detector 215. Filtering out gradients may, for example, decrease the number of false positives produced by object detector 215 and may improve the accuracy of discriminator 220.

Although FIG. 3 illustrates image transformer 210 as a separate module of object recognition system 200, those skilled in the art will appreciate that the functionality of image transformer 210 may be embodied in another module. For example, camera interface 206 or discriminator 220 may perform the functionality of image transformer 210. Those with skill in the art will recognize that the functionality described above with respect to image transformer 210 may be performed by any module of object recognition system 200 to assist discriminator 220 with more accurate classification of detected objects and improve the processing time of discriminator 220.

According to some embodiments, discriminator 220 may assign a confidence level to the detected object data indicating a level of confidence that the detected object data comports with one or more of the object classification models. As the discriminator 220 receives detected object data, it may compare it to each of the object classification models, and assign the detected object a classification consistent with the object classification model that has the highest confidence level. For example, when discriminator 220 receives detected object data, it may apply it to equipment model 221, people model 222, and light vehicle model 223. Discriminator 220 may determine a confidence level of 75% for equipment model 221, 15% for people model 222, and 60% for light vehicle model 223 for the detected object data. As equipment model 221 produces the highest confidence level for the detected object data, the discriminator 220 may classify the detected object as equipment. In some embodiments, the discriminator 220 may be configured to compare the detected object data to classification models until a threshold confidence level is reached. For example, the threshold confidence level may be 85%. When discriminator 220 compares detected object data to equipment model 221, it may determine a confidence level of 95%. As 95% is above the 85% threshold, it may not compare it to the other classification models. In cases where discriminator 220 fails to determine a confidence level exceeding the threshold, it may assign the detected object data according to the highest determined level. In some embodiments, discriminator 220 may not classify the object until it receives more data to assist in classifying the object.

For example, discriminator 220 may use tracking data from object tracker 230, such as the speed of the object, to further determine the classification of the detected object.

Object recognition system 200 may include an object tracker 230. Object tracker 230 may track a detected object and its position over time. According to some embodiments, object tracker 230 may track detected objects and interface with discriminator 220 to provide additional data that may be used to determine the type of a detected object. Discriminator 220 may use object tracker's 230 position and time data to determine the speed of a detected object. The speed of the detected object may be used in conjunction with the shape and size of the object to classify it according to the equipment model 221, the people model 222, or the light vehicle model 223. For example, the discriminator 220 may receive detected object data that indicates with 60% confidence that an object is equipment, and 65% confidence that the object is a light vehicle. When the detected object moves, discriminator 220 may detect that the object is moving at twenty miles per hour. As equipment is not likely to move this quickly, discriminator 220 may increase the confidence level associated with light vehicles to 95% while decreasing the confidence level associated with equipment to 40%. Accordingly, discriminator 220 may classify the detected object as a light vehicle.

As the shape and size of an object is unlikely to change over time, object tracker 230 may use the shape and size of a detected object to track its position over time. Other attributes may also be used, such as color. In some embodiments, position may also be used to track objects. For example, when object tracker 230 receives detected object data of roughly the same size and shape as a tracked object, in a position close to the last position of the tracked object, object tracker 230 may assume that the detected object data is data for the tracked object.

Object tracker 230 may also provide the advantage of allowing discriminator 220 to bypass computationally expensive classification of objects for those objects that have already been detected and classified above a threshold confidence level. According to some embodiments, before discriminator 220 classifies a detected object according to the object classification models 221, 222, 223, discriminator 220 may check with object tracker 230 to determine if the object has already been classified. If the detected object has been classified with a confidence level exceeding the threshold, discriminator 220 will bypass comparing the detected object data to the object classification models. For example, discriminator 220 may receive detected object data related to a detected light vehicle. Before discriminator 220 applies the object classification models to the data, it may pass the detected object data to object tracker 230 to determine if the object has already been classified. Object tracker 230 may compare the shape, size and position of the detected object to the list of objects it is tracking, and it may determine that an object of the same shape, size and position has already been classified as a light vehicle with 90% confidence. Object tracker 230 may then inform discriminator 220 that the detected object is being tracked, and discriminator 220 may bypass classifying the object.

Once an object has been detected, tracked, and classified, alert processor 250 may analyze the object and operational state data received from machine interface 207 to determine if an alert needs to be generated. Alerts may be generated when a collision is likely to occur between the detected object and machine 110. Whether, and when, alert processor 250 generates an alert may be based on the detected object's type. For example, alert processor 250 may generate an alert anytime a person is detected within the environment of machine 110, but alert processor 250 may only generate an alert when a collision is imminent between equipment and machine 110. The type of an alert may vary depending on the type of the detected object and whether a collision is imminent. For example, the alert processor 250 may generate a first alert that displays a detected object on display 260 as soon as object detector 215 detects an object, but alert processor 250 may generate a second alert that makes a sound and flashes a warning when a detected object is about to collide with machine 110.

Alert processor 250 advantageously uses operational state data of machine 110 in combination with detected object data to determine whether to generate an alert. Alert processor 250 may use the speed and direction of machine 110, obtained from machine interface 207, to determine the likely path of machine 110. After determining the likely path, alert processor 250 may determine whether any detected or tracked objects are in the likely path, and it may generate an appropriate alert, if necessary. For example, alert processor 250 may determine that machine 110 is moving along a straight path and that a detected object is along that straight path. Alert processor 250 may determine that if machine 110 does not change direction and if the detected object does not move, a collision is likely to occur in 10 seconds. Accordingly, alert processor 250 may generate an alert such as an audible warning. Alert processor 250 may also render a visual warning on display 260.

Figure 4:
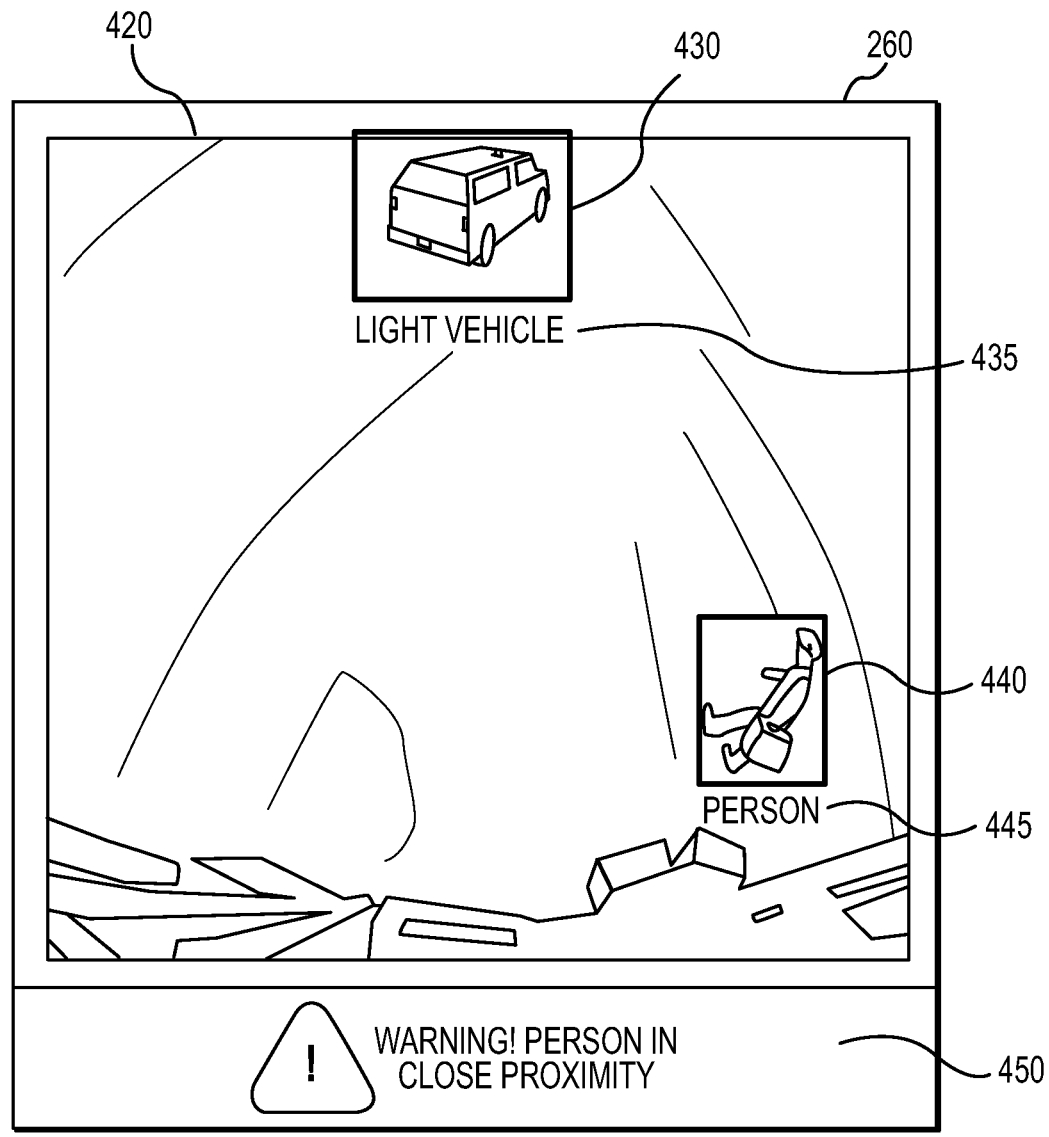
FIG. 4 is a pictorial illustration of an exemplary disclosed image that may be rendered by the object recognition system of FIG. 2.

Object recognition system 200 may also include display 260. Display 260 is typically disposed in close proximity to the cabin of machine 110 and within the view of the operator of machine 110. Display 260 may be any display capable of rendering graphics generated by a general purpose computing system. For example, display 260 may be a LCD screen, LED screen, CRT screen, plasma screen, or some other screen suitable for use in machine 110. Display 260 may be connected to the processor of object recognition system 200, and the processor may execute instructions to render graphics and images on display 260. For example, FIG. 4 is a pictorial illustration of an example image 420 that may be rendered by object recognition system 200. As shown in FIG. 4, display 260 may include warning 450 describing the alert generated by alert processor 250. Alert warning 450 may include a description of the type of object that is the subject of the alert. In some embodiments, alert warning 450 may be color coded to indicate a severity of the alert to the operator of machine 110.

Image 420 may be an image captured by camera 140 and object recognition system 200 may render image 420 on display 260. Image 420 may include indications of detected objects showing the operator of machine 110 their approximate location. According to one embodiment, the characteristics of the indication of the object may be based on the detected objects' type, that is, the object recognition system 200 may render on display 260 a first indication when a first object is of a first type, and may render a second indication when a second object is of a second type. For example, object recognition system 200 may render light vehicle indication box 430 that is colored yellow around a detected light vehicle and person indication box 440 that is colored red around a detected person. In addition, object recognition system 200 may render text on display 260 labeling detected objects by their type. For example, object recognition system 200 may render light vehicle label 435 beneath, above, or to the side of a detected light vehicle, and it may render person label 445 beneath, above, or to the side of a detected person.

Industrial Applicability

The disclosed object recognition system 200 may be applicable to any machine that includes one or more radar devices and one or more cameras. The disclosed object recognition system 200 may allow an operator of machine 110 to operate it more safely by detecting and recognizing objects within the environment of machine 110 and alerting the operator of their presence. The disclosed object recognition system 200 may advantageously process radar data received by radar devices and image data received by cameras by limiting object recognition processing to those areas of an image where an object has been detected by radar. Further, the disclosed object recognition system 200 may offer advantages by utilizing object tracking data so that image data corresponding to previously recognized objects is not processed. The operation of object recognition system 200 will now be explained.

Figure 5:
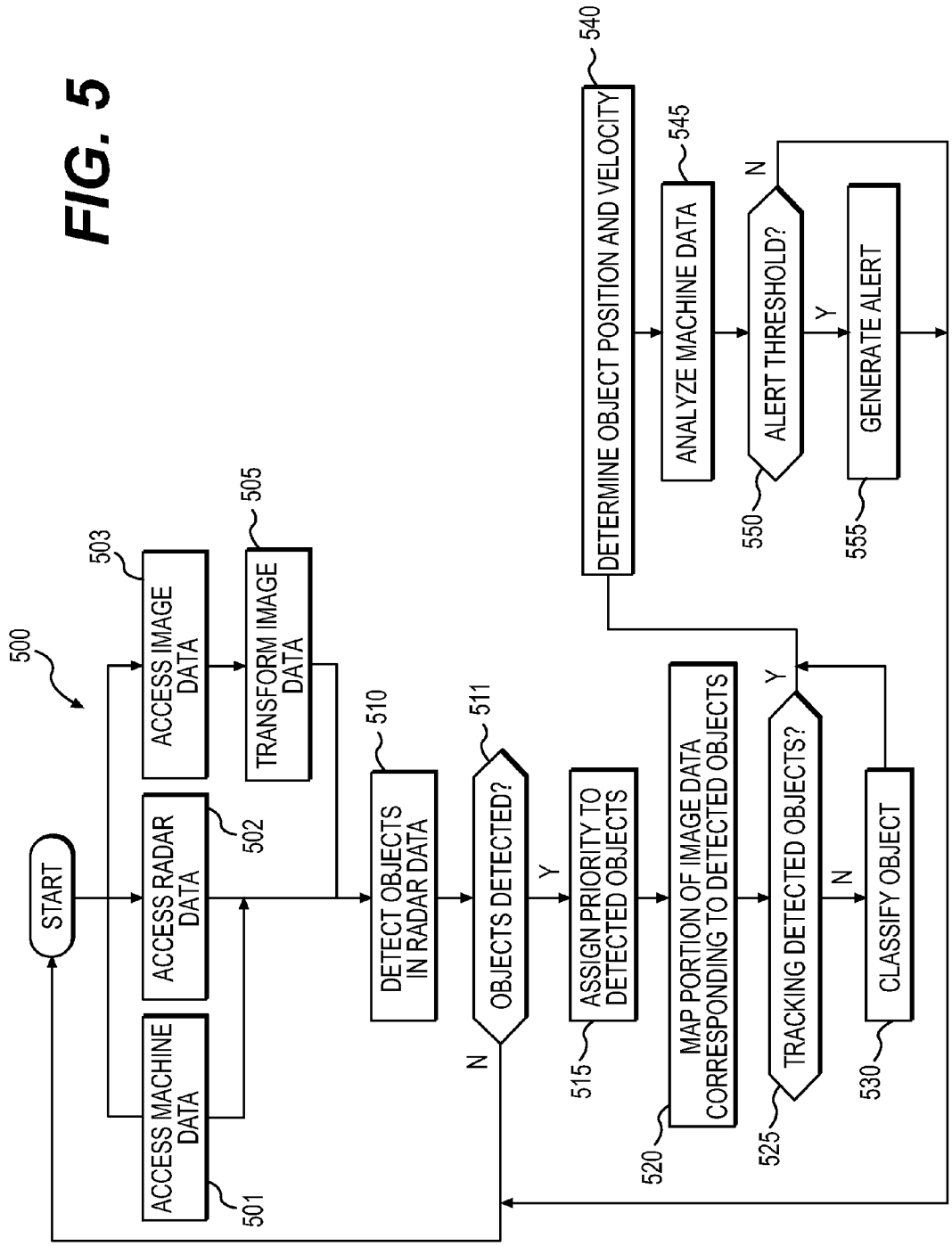
FIG. 5 is a flowchart illustrating an exemplary disclosed method that may be performed by the object recognition system of FIG. 2.

FIG. 5 is a flowchart illustrating a method 500 that may be performed by object recognition system 200. During the operation of machine 110, object recognition system 200 may perform method 500 to detect and recognize objects and generate alerts when necessary. Object recognition system 200 begins method 500 by accessing machine data, radar data, and image data at steps 501, 502, and 503. The object recognition system 200 may access machine data from one or more sensors connected to machine 110 and configured to sense operational state data describing the operation of machine 110. The object recognition system 200 may access the radar data from one or more radar devices connected to machine 110 and it may access the image data from one or more cameras connected to machine 110. In some embodiments, object recognition system 200 accesses the machine data, the radar data and the image data in parallel, that is, the data is received approximately simultaneously.

Figure 6:
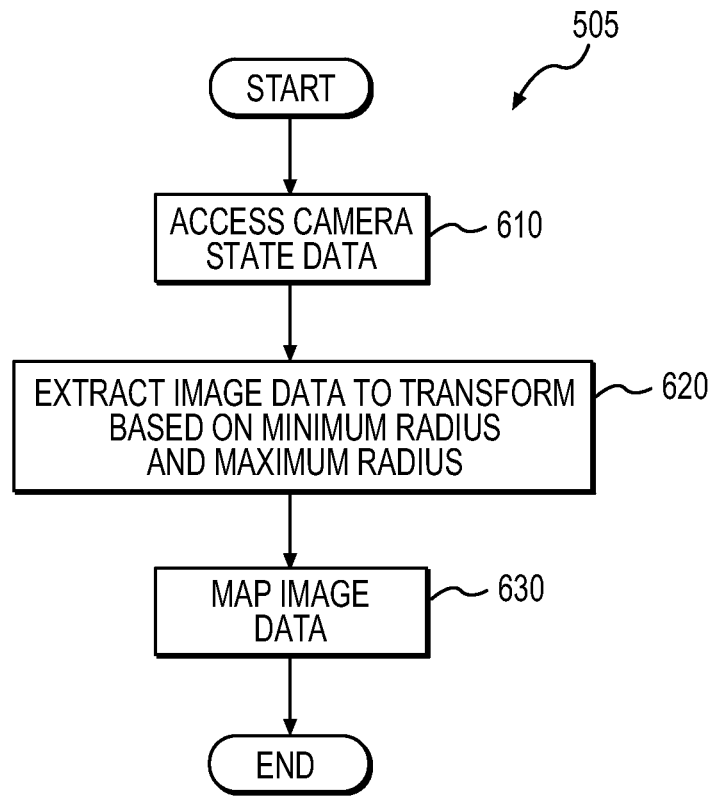
FIG. 6 is a flowchart illustrating an exemplary disclosed method that may be performed by the object recognition system of FIG. 2.

Object recognition system 200 may transform the accessed image data at step 505. FIG. 6 is a flowchart illustrating step 505 in greater detail as it may be performed by object recognition system 200 according to one exemplary embodiment. Object recognition system 200 begins transforming accessed image data, or source image data, at step 610 by first accessing camera state data. The camera state data may describe attributes of the camera that may be needed by object recognition system 200 to transform the source image data. For example, the camera state data may include, among other things, the pixel position of the down-vector of the camera that captured the source image data. The camera state data may also include information relating to the radar device collecting radar data that is to be associated with the source image data captured by the camera. For example, the camera state data may include a minimum radius, measured in pixels from the down-vector, corresponding to the nearest distance in the radar device's range, and the camera state data may include a maximum radius, measured in pixels from the down-vector, corresponding to the furthest distance in the radar device's range. For example, when the radar device associated with the camera has a range of one meter to twenty meters, the camera state data may include a minimum radius of 50 pixels (corresponding to one meter), and a maximum radius of 1000 pixels (corresponding to twenty meters). In some embodiments, image transformation may only be done for parts of the image where an object was detected. Accordingly, the camera state data may include a data structure mapping radar detected distances to radius lengths measured in pixels. For example, the data structure may indicate that a radar detected distance of five meters corresponds to 100 pixels, and a radar detected distance of fifteen meters corresponds to 300 pixels. Thus, object recognition system 200 may determine the minimum radius and maximum radius for image transformation by determining the distances of radar detected objects from the accessed radar data and using the camera state data to determine the corresponding minimum radius and maximum radius.

Object recognition system 200 uses the minimum radius and the maximum radius at step 620 to extract a portion of the image data for transformation. As described above, the values of the minimum radius and maximum radius may depend on the radar device associated with the camera that captured the source image data. Thus, object recognition system 200 may use the minimum radius and maximum radius to transform only those portions of the image where an object is likely to be detected.

Once object recognition system 200 extracts the image data to be transformed, it maps the extracted source image data to the transformed image at step 620. Object recognition system 200 may use a look-up table or other direct mapping to map pixels from the source image data to the transformed image. The mapping may be one-to-one or one-to-many depending on the geometry of the camera lens and the location of the pixel within in the source image. For example, object recognition system 200 may map a pixel located at (1,1) in the source image data to pixels located at (250,1) and (251,1) in the transformed image, and object recognition system 220 may map a pixel located at (500,500) to a pixel located at (425,500) in the transformed image. By using a direct mapping scheme, object recognition system 200 may quickly create a transformed image that may be used for object recognition.

Returning to FIG. 5, once object recognition system 200 transforms the image data, it may detect objects in the radar data at step 510. Object recognition system 200 may analyze the accessed radar data to determine whether objects have been detected and the distances and angular position of the detected objects. When the radar data does not indicate any objects in the environment of machine 110 (step 511: NO), object recognition system 200 returns to the beginning of method 500 and may access machine, radar and image data. When the radar data indicates an object in the environment of machine 110 (step 511: YES), object recognition system 220 may assign priorities to the detected objects for processing (step 515). Priority may be assigned using the distance each detected object is from machine 110 as indicated in the radar data. For example, the radar data may indicate two objects were detected in the environment of machine 110, a first object at three meters and a second object at ten meters. The object recognition system 200 may assign the first object highest priority and the second object lowest priority. By assigning priorities to detected objects, object recognition system 200 may process objects in an order consistent with their risk of collision with machine 110.

Next, at step 520, object recognition system 200 processes each detected object in order of priority by first mapping a portion of the accessed image data, or transformed image data, to the detected objects in the radar data. Object recognition system 200 may maintain one or more data structures that map distances and angular positions of radar detected objects to pixel locations of image data. Object recognition system 200 may use the mapping to determine which portions of the image data are to be processed for object detection and recognition. For example, the mapping might indicate that a radar detected object at three meters and fifteen degrees to the right of the radar device corresponds to pixel location (800, 950) in the image data. For efficient processing, object recognition system 200 may limit image processing to only those locations where the radar data indicates an object has been detected.

Object recognition system 200 may provide further efficiency by tracking objects. At step 525, object recognition system 200 determines whether it is already tracking the detected object. If it is not tracking the object (step 525: NO), object recognition system 200 classifies the object by type at step 530. For example, object recognition system 200 may classify the object as equipment, a light vehicle or a person. Once classified, object recognition system 200 tracks the object. If object recognition system 200 is tracking the object (step 525: YES), it may bypass step 530. As step 530 may be complex and computationally expensive, object recognition system 200 advantageously provides more efficient processing of data by only performing step 530 when an object has not been classified.

Next, object recognition system 200 determines the detected object's position and velocity at step 540. Object recognition system 200 may determine the detected object's position using the radar data, for example. To determine the object's velocity, object recognition system 200 may use tracking data corresponding to the object. The tracking data may include the object's position over time, which object recognition system 200 may use to determine the velocity of the object. Object recognition system 200 may compare the object's position and velocity to the accessed machine data to determine whether a collision is likely to occur.

At step 545, object recognition system 200 may analyze the accessed machine data. The machine data may include operational state data of machine 110, such as the speed and direction of machine 110 or its steering angle. Object recognition system 200 may use the operational state data to create a predicted path of machine 110. The predicted path may be compared to the position and velocity of the detected object to determine whether a collision is likely to occur and when the collision is likely to occur. Object recognition system 200 may use the collision prediction to determine whether to generate an alert.

At step 550, object recognition system 200 determines whether an alert threshold has been met. An alert threshold may be a set of rules that specifies when an alert will be generated and what type of alert will be generated. Alert thresholds may be time based, distance based, or object type based. For example, the alert threshold may be five seconds to collision, three meters from machine 110, or any time a person is detected within the environment of machine 110. The alert threshold may vary depending on the type of object that is the subject of the alert. For example, an alert threshold may be ten seconds to collision for a person, but five seconds to collision for equipment. When an alert threshold is satisfied (step 550: YES), object recognition system 200 may generate an alert at step 555. When the alert threshold is not satisfied (step 550: NO), object recognition system 200 returns the to beginning of method 500 and accesses machine data, radar data and image data at steps 501, 502, and 503 respectfully.

Several advantages over the prior art may be associated with object recognition system 200 as it implements methods for improving the processing speed of object recognition, thereby allowing it to process radar and image data in real-time, or near real-time, from several radar devices and cameras. For example, object recognition system 200 may offer performance advantages by processing portions of image data where objects are likely to appear based on radar data. Further, object recognition system 200 may offer performance advantages by tracking detected objects and performing object classification on the objects that are not being tracked. Object recognition system 200 also offers advantages by including an image transformer 210 that increases the accuracy of object recognition and increases processing time by transforming images captured by wide-angle, top-down view cameras, birds-eye view cameras, fisheye cameras, or other cameras producing non-ground level perspectives. By transforming images to a uniform perspective such that objects in the image are of predictable orientation, object recognition system 200 eliminates the need for object classifications models that account for multiple orientations of objects.

It will be apparent to those skilled in the art that various modifications and variations can be made to the disclosed object recognition system. Other embodiments will be apparent to those skilled in the art from consideration of the specification and practice of the disclosed coverage determining system. It is intended that the specification and examples be considered as exemplary only, with a true scope being indicated by the following claims and their equivalents.

What is claimed is:

1. An object recognition system comprising:
 a camera configured to generate image data of an environment of a machine;
 a radar device configured to generate radar data of the environment of the machine; and
 a processor configured to:
 detect an object in the environment based on the radar data;
 map the radar data to a portion of the image data corresponding to the detected object to create a mapped portion of the image data; and
 selectively classify the detected object using the mapped portion of the image data.

2. The system of claim 1, wherein the processor is configured to classify the detected object as at least one of a person, a vehicle, or equipment.

3. The system of claim 1, wherein the processor is further configured to track the detected object.

4. The system of claim 1, wherein the processor is further configured to determine whether to classify the detected object based at least in part on whether the mapped portion of the image data is similar to image data of a previously tracked object.

5. The system of claim 1, further comprising a display, and wherein the processor is further configured to render the image data on the display.

6. The system of claim 5 wherein the processor is further configured to render a first indication of the detected object when the detected object is classified as a first type of object and a second indication of the detected object when the detected object is classified as a second type of object.

7. The system of claim 6 wherein the first indication is a first text string and the second indication is a second text string.

8. The system of claim 1, wherein the processor is further configured to:
 determine a priority for classifying the object based at least in part on the radar data.

9. The system of claim 8, wherein the processor is further configured to:
 determine an operational state of the machine;
 determine whether the operational state indicates that a collision is likely to occur between the machine and the detected object; and
 generate an alert when it is determined that the collision may occur.

10. A method for recognizing objects with a machine in an environment of the machine in using a radar device and an image device, the method comprising:
 accessing, with a processor, radar data of the radar device;

detecting, with a processor, an object in the environment of the machine based on the radar data;

accessing, with the processor, image data of the image device, mapping the radar data to a portion of the image data corresponding to the detected object to create a mapped portion of the image data; and selected classifying, with the processor, the detected object using the mapped portion of the image data.

11. The method of claim 10 wherein the detected object is classified as at least one of a person, a vehicle, or equipment.

12. The method of claim 10 further including tracking the detected object.

13. The method of claim 12 further including determining whether to classify the detected object based at least in part on whether the mapped portion of the image data is similar to image data of a previously tracked object.

14. The method of claim 10 further including rendering the image data on a display within the machine.

15. The method of claim 14 wherein the rendering includes providing an indication of the detected object.

16. The method of claim 14 wherein the indication is a first indication when the detected object is classified as a first type of object and a second indication when the detected object is classified as second type of object.

17. The method of claim 16, wherein the first indication is a first text string and the second indication is a second text string.

18. The method of claim 10 further including:
determining a priority for classifying the object based at least in part on the radar data.

19. The method of claim 17, further including:
determining an operational state of the machine;
determining whether the operational state indicates that a collision is likely to occur between the machine and the detected object; and
generating an alert when it is determined that the collision may occur.

20. A mobile machine comprising:
a cabin;
a display disposed within the cabin;
a frame;
a camera connected the frame and configured to generate image data of an environment of the mobile machine;
a radar device connected to the frame and configured to generate radar data of the environment of the mobile machine; and
a processor in communication with the camera, the radar device, and the display, the processor configured to:
detect one or more objects in the environment based on the radar data;
map the radar data to a portion of the image data corresponding to the detected object to create a mapped portion of the image data;
determine respective priorities for the one or more objects based at least in part on an operational state of the mobile machine;
classify a selected object of the one or more objects, the selected object having the highest respective priority of the one or more objects, by:
determining whether the selected object is being tracked based at least in part on the mapped portion of the image data for the selected object, and
when the selected object is not being tracked, assigning the selected object a classification; and
render the image data, an indication of the selected object, and an indication of the classification of the selected object on the display.

* * * * *